(12) United States Patent
Pandya

(10) Patent No.: US 6,730,229 B1
(45) Date of Patent: May 4, 2004

(54) FILTER SCREEN NOZZLE AND SYSTEM FOR FLUID PROCESSING

(75) Inventor: Ken V. Pandya, Plano, TX (US)

(73) Assignee: AWTS, Inc., Plano, TX (US)

( * ) Notice: Subject to any disclaimer, the term of this patent is extended or adjusted under 35 U.S.C. 154(b) by 111 days.

(21) Appl. No.: 09/710,460

(22) Filed: Nov. 10, 2000

(51) Int. Cl.$^7$ .............................................. B01D 15/04
(52) U.S. Cl. ...................... 210/670; 210/678; 210/136; 210/289
(58) Field of Search ............................... 210/670, 678, 210/685, 136, 289, 291, 541; 239/590.3

(56) References Cited

U.S. PATENT DOCUMENTS

| | | | | |
|---|---|---|---|---|
| 482,436 A | * | 9/1892 | Deutsch | 210/291 |
| 1,784,893 A | * | 12/1930 | Duden | 210/289 |
| 3,730,348 A | * | 5/1973 | Weis et al. | 210/289 |
| 5,545,319 A | * | 8/1996 | Hart et al. | 210/291 |

* cited by examiner

*Primary Examiner*—Ivars C. Cintins
(74) *Attorney, Agent, or Firm*—Leydig, Voit & Mayer, Ltd.

(57) ABSTRACT

A nozzle and associated system is for treating fluids is provided, particularly for a system including a reaction vessel containing a granular filter or ion exchange medium and a fluid manifold immersed in the granular or ion exchange medium. The nozzle has an outer screen defining a interior cavity, a duct for providing flow to the interior cavity, and a restrictor having at least one orifice through which the duct is in communication with the cavity. The orifice or orifices of the restrictor have a total open area that is less than the total open area of the outer screen. By this sizing relationship the nozzle flow rate is dictated by the inner orifice area, not the outer screen open area. In comparison to the outer screen openings each of the inner orifices is less susceptible to plugging or wearing than the narrow outer screen openings which are adjacent to medium. The nozzle according to the invention therefore provides a consistent predetermined flow rate and pressure drop profile over extended periods. Advantageously, a manifold including a spaced array of the nozzles has consistent flow rates among all of the nozzles, facilitating a desired flow profile through the medium to the manifold. Also disclosed are nozzle embodiments having multiple fluid ducts, each having a dedicated to restrictor orifice.

16 Claims, 9 Drawing Sheets

FILTER SCREEN NOZZLE AND SYSTEM FOR FLUID PROCESSING

FIELD OF THE INVENTION

The present invention generally relates to fluid purification and particularly relates to a nozzle for use in a fluid treatment vessel.

BACKGROUND OF THE INVENTION

Fluids are commonly processed for purification or chemical treatment. More particularly, water and various chemicals, in liquid or gaseous form, are purified or otherwise treated for consumption, manufacturing or industrial processes. For example, water from an available source, such as a river, lake, ocean or deep well, usually contains undesired impurities, including suspended solids, and organic and inorganic impurities. The impurities must be removed to meet certain purity requirements, depending upon the intended use for the water. Public water systems are governmentally regulated so that impurities do not exceed levels considered safe for consumption. Certain industrial applications require even fewer impurities than the typical levels for drinking water. Semiconductor processing, pharmaceutical manufacturing, and steam boilers are sonic examples of applications requiring water with extremely low levels of impurities.

Fluid treatment systems are known for purifying water and otherwise processing fluids, including various liquid-from-liquid, liquid-from-solid, and liquid-from-gas separation processes. Fluid treatment systems often include more than one reactor vessel. For example, at least two reactor vessels are used in a typical water demineralizer purification system for a community, populated facility, or industrial facility that uses large amounts of purified water for industrial processes such as boiler feed or washing off electronics parts. Other reactor vessel treatment systems are known for processing steam, acid, caustic, and a variety of other gases or liquids.

Conventionally, a reactor vessel includes a large tank which contains a granular processing medium. Such as sand, anthracite, carbon, cation exchange resins, anion exchange resins, and mixed-bed resins. The processing medium occupies a lower portion of the vessel's interior chamber. A typical later demineralizer purification system includes at least two reactor vessels—a first containing a cation exchange resin medium and a second containing an anion exchange resin medium.

To treat the fluid, the fluid is brought into contact with the processing medium, such as ion exchange resin. The vessel includes an upper manifold for introducing a flow of the fluid into an upper portion of the vessel, from where it falls onto the processing medium. As the fluid flows downwardly through the processing medium, the fluid reacts with the processing medium during the physical contact. The treated fluid is then removed through a lower manifold that is immersed in the processing medium at a bottom portion of the vessel.

The lower manifold, which feeds to a common duct, includes an array of conventional nozzles which are generally spaced across the bottom portion of the vessel. To separate the fluid from the medium, each of the conventional nozzles has an exterior screen with narrow openings sized to prevent the passage of the processing medium. For example, in a system having an ion exchange resin as a process medium, which is typically comprised of resin beads, each having a diameter of generally about 2 mm (15–40 mesh), the nozzle screen openings are designed to be very narrow—only a few thousands of an inch wide.

In most prior art nozzles, the flow rate is governed by the collective open area of the screen. For reasons explained in greater detail below, it is desirable that each nozzle has a predetermined flow rate. Specifically, the flow rates are desirably consistent among the nozzles withdrawing fluid in order to promote an optimal flow profile. Therefore, in conventional nozzles, the screen must be manufactured with a high degree of precision to provide a predetermined total open area, in turn providing, a desired flow rate.

Unfortunately, prior art fluid treatment systems have been known to lose treatment effectiveness, worsening over time. Some inefficiencies have been attributed to differences in flow rates that develop among a nozzles on a particular manifold. For example, a common problem is known as "channeling," wherein the fluid favors a particular flow path or "channel" through the medium. Particularly, a majority of the fluid flows along a path of least resistance toward a nozzle having the greatest available open area. Of course, the processing medium in the "channel" soon becomes exhausted, because it is subjected to a disproportionate rate of fluid contact. At the same time, the medium in other areas of the vessel is not effectively utilized. Thus, channeling causes a reactor vessel to rapidly deplete its overall effectiveness, including loss of productivity, increased chemical usage, and increased waste.

In most conventional nozzles, the flow rate and fluid flow restriction is a function of the open area of the collective holes in the nozzle screen. Accordingly, a manifold is assembled using a plurality of like nozzles having equivalent screen open areas. Such nozzles have relatively equal flow rates, at least initially upon installation. Unfortunately, over time, some screen openings are known to become plugged with foreign matter or broken medium beads, reducing the open area and reducing the flow rate in the plugged nozzles. At the same time, the flow increase through unplugged screen openings has a wearing effect. The flow wear enlarges the unplugged openings, thereby increasing the flow through those unplugged openings.

Notably an increasing flow rate through an opening results in wear rate on the adjacent screen material. Further increasing the screen openings of the favored nozzles. Moreover, the wire used to form such screens typically has a triangular cross section, for reasons explained below. When new, this triangular wire has edges formed by acute surfaces, but as these edges wear, the opening adjacent the screen rapidly expands at a non-linear rate due to the wire geometry.

Over time, the combination of screen plugging and screen wear result in a significant disparity in the open areas, and flow rates, among the conventional nozzles of a particular system. The drainage flow through the lower manifold therefore favors nozzles having the greatest screen opening areas, thus leading to the undesired channeling effect and associated operating inefficiencies. These inefficiencies result in lost productivity, an increase in required manpower due to increased regeneration requirements, and poor product quality.

In one known system, a restrictor plate was positioned across the duct mounted to the screen to provide communication between the manifold and the cavity defined by the screen. In this nozzle, however, the orifice was not positioned to optimally control a direction of flow through the screen for maximal efficiency.

Most treatment systems require a periodic regeneration or reconditioning of the processing medium. For example, in a vessel wherein the processing medium is ion exchange resin beads, charged sites on each bead become bonded with molecules of the impurities of the treated fluid, until the sites are used. In order for the medium to be effective, the beads must be periodically reconditioned with a chemical bath that takes away the molecules from the charge sites on the ion exchange medium. For introducing such reconditioning chemicals, a reactor vessel is typically equipped with an internal distributor in an upper or middle portion of the vessel to introduce a flow of the chemicals above the processing medium. The chemicals flow down through the medium and are extracted through the nozzles of the lower manifold near the bottom of the tank.

Another conventional nozzle is known as a pipe-based filter screen nozzle. Such a pipe-based nozzle is basically an elongated filter screen nozzle of the type described above. In a treatment vessel employing pipe-based nozzles, a plurality of the pipe-based nozzles are mounted to a central hub near the bottom of the medium, the nozzles projecting radially outwardly from the hub.

A problem with many prior art systems employing long pipe based filter screen nozzles is that these systems have not optimally utilized the medium near bottom of the tank. Most tanks have curved, concave bottoms and tops to structurally withstand high operating pressures. In some of the prior art systems, the pipe based screen nozzles have been mounted to the manifold so as to be positioned in a common horizontal plane. This planar arrangement is wasteful, as it fails to totally utilize large space in the head of the vessel at the concave bottom of the tank below the nozzles. To avoid wasting this unused medium, it is known to provide a false bottom in the tank. However, such a system fails to optimally utilize the tank volume.

Therefore, a need exists for an improved fluid treatment system having greater efficiency. More particularly, a need exists for a nozzle that provides improved flow rate and pressure drop control.

SUMMARY OF THE INVENTION

It is an object of the invention to provide a high efficiency screen nozzle that optimizes the efficiency of fluid treatment operations.

Another object of the present invention is to provide an improved filter screen nozzle.

An additional object of the invention is to provide a nozzle that provides a consistent, predetermined flow rate that is not directly dependent upon the outer screen open area, thereby eliminating concern of unplanned or uncontrollable variations of the screen open area.

Still another object of the invention is to provide a fluid treatment system having improved flow profiles through a processing medium.

A further object of the invention is an improved nozzle which may be retrofit as a replacement nozzle in existing systems with little modification to existing manifold plumbing, thereby providing a cost-effective improvement to existing fluid treatment systems.

The present invention achieves the aforementioned objects and overcomes the deficiencies associated with the prior art fluid processing systems. For example, in an embodiment, a nozzle according to the invention has an outer screen with a total screen opening, area and an inner restrictor having at least one orifice accounting for a total orifice area that is less than the screen opening area. The nozzle includes a duct which is mounted to a manifold within a reactor vessel. Flow to or from the duct must pass through the at least one restrictor orifice. The nozzle has a predetermined flow rate and pressure drop dictated by the inner orifice area. The nozzle maintains a consistent flow rate over long periods of use, because the orifice open area is not as susceptible to plugging or wear as the outer screen.

The present invention provides a nozzle which results in improved and consistent flow, profiles of a fluid passing through a process medium. More particularly, a manifold having a plurality of the nozzles promotes a uniform flow of process fluids inside the reactor vessel to optimize intimate mixing and/or contact of process fluids (e.g. acid or caustic) with process media (e.g. ion exchange resin).

Advantageously, because the nozzle improves the performance and efficiency of the fluid treatment, cost savings are achieved by reducing the frequency of regeneration cycles, in turn reducing the amount of the regeneration chemicals used. Additionally, the nozzle also promotes an even distribution of the regeneration chemicals, thereby optimizing the effectiveness of the medium regeneration and system cleaning.

An advantage of the present invention is to provide a filter screen nozzle in which flow through the nozzle is not dependent upon the area of the screen openings.

Another advantage of the present invention is to provide a nozzle system that optimizes uniform flow patterns through a processing medium within a reaction vessel.

A further advantage o the present invention is to provide a nozzle system that optimizes contact between the fluid and the processing medium.

Yet another advantage of the present invention is to provide a nozzle that optimizes the performance, service cycle and overall life of a fluid processing system.

A still further advantage of the present invention is to provide a nozzle that may be retrofit onto an existing fluid treatment system or utilized in constructing a new system.

Additional features and advantages of the present invention are described in, and apparent from, the detailed description, figures and claims.

BRIEF DESCRIPTION OF THE DRAWINGS

FIG. 7a shows the treatment vessel in a service mode: FIG. 7b shows the treatment vessel in a reverse mode: and FIG. 7c shows the treatment vessel in a regeneration mode.

DETAILED DESCRIPTION OF THE PREFERRED EMBODIMENTS

Figure 1:
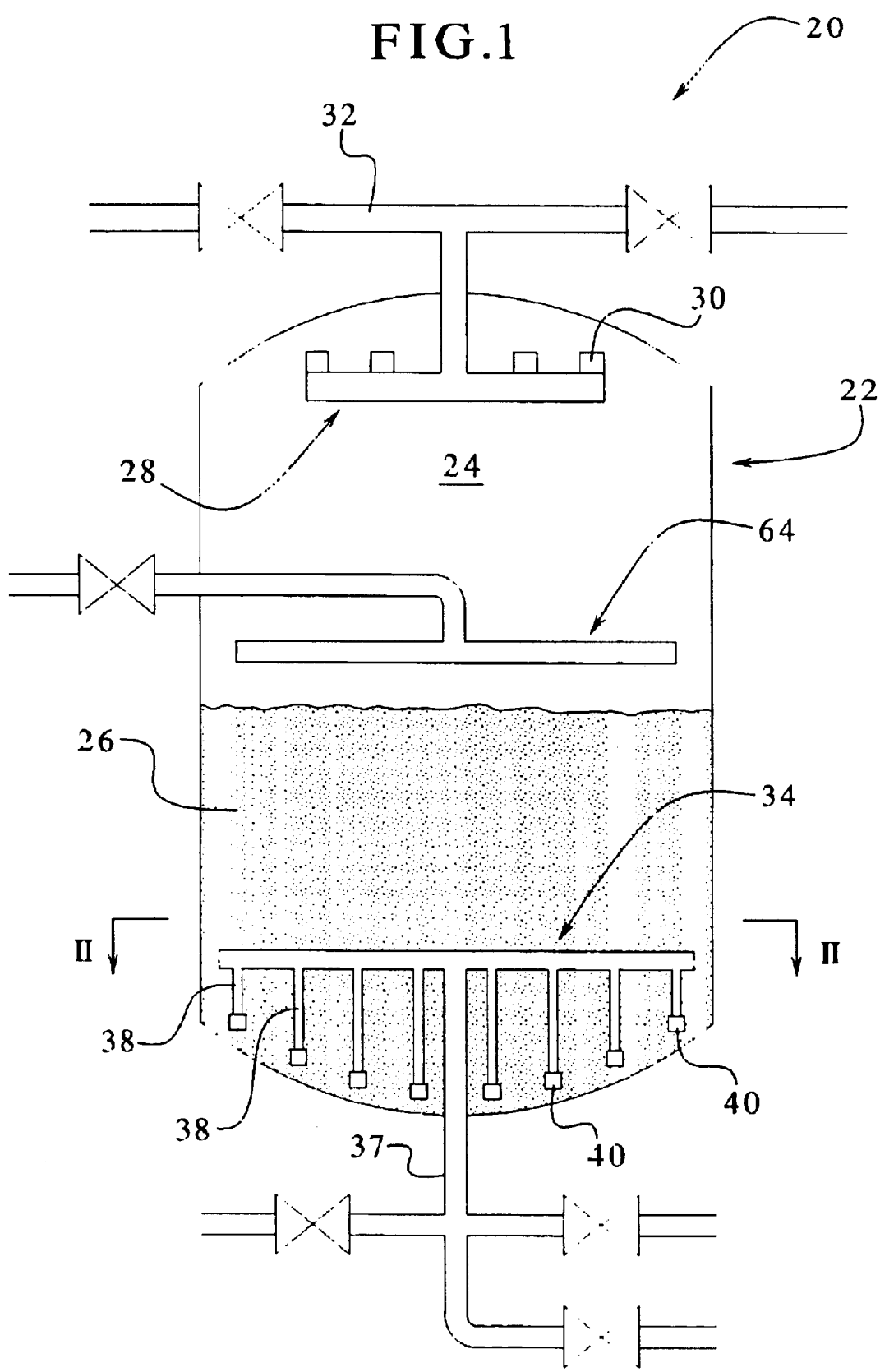
FIG. 1 is a sectional, schematic side view of a reactor vessel for processing fluid.

Now referring to the figures, wherein like numerals designate like components, in FIG. 1 there is shown an exemplary fluid treatment system 20. The treatment system 20 is useful for treating fluids, for example for purifying water. Generally, the treatment system 20 includes a vessel 22 defining an interior chamber 24 that is partially occupied by a processing medium 26. The processing medium 26 occupies the lower portion of the vessel 22. The vessel 22 includes an upper manifold 28 having a plurality of nozzles 30 for introducing a process fluid, such as water, into the vessel 22 above the processing medium 26. An upper main line 32 delivers a flow of the process fluid to the upper manifold 28.

Figure 2:
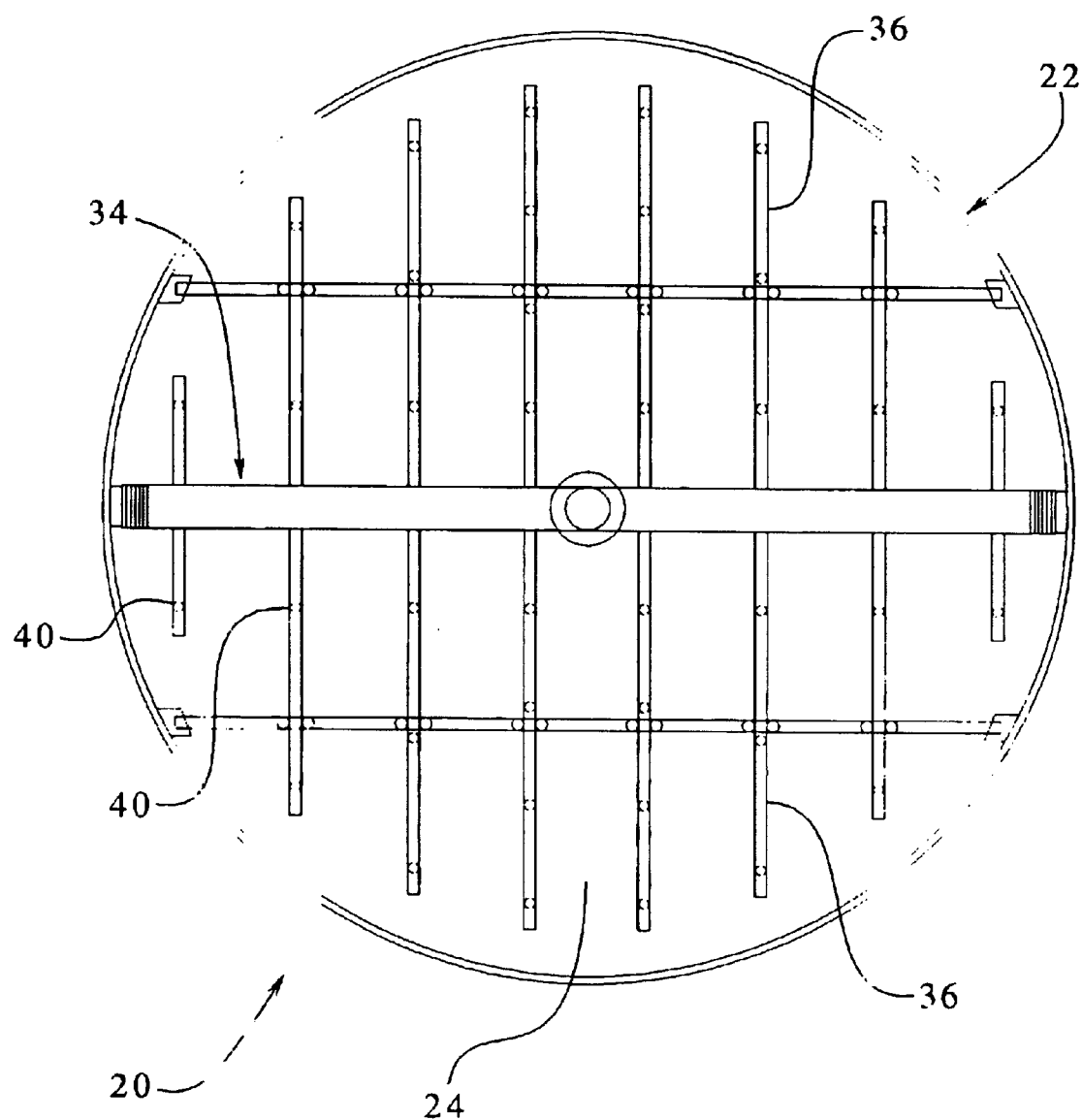
FIG. 2 is a sectional, schematic view as taken generally along line II—II of FIG. 1, showing, in plan view, a lower manifold.
Figure 3:
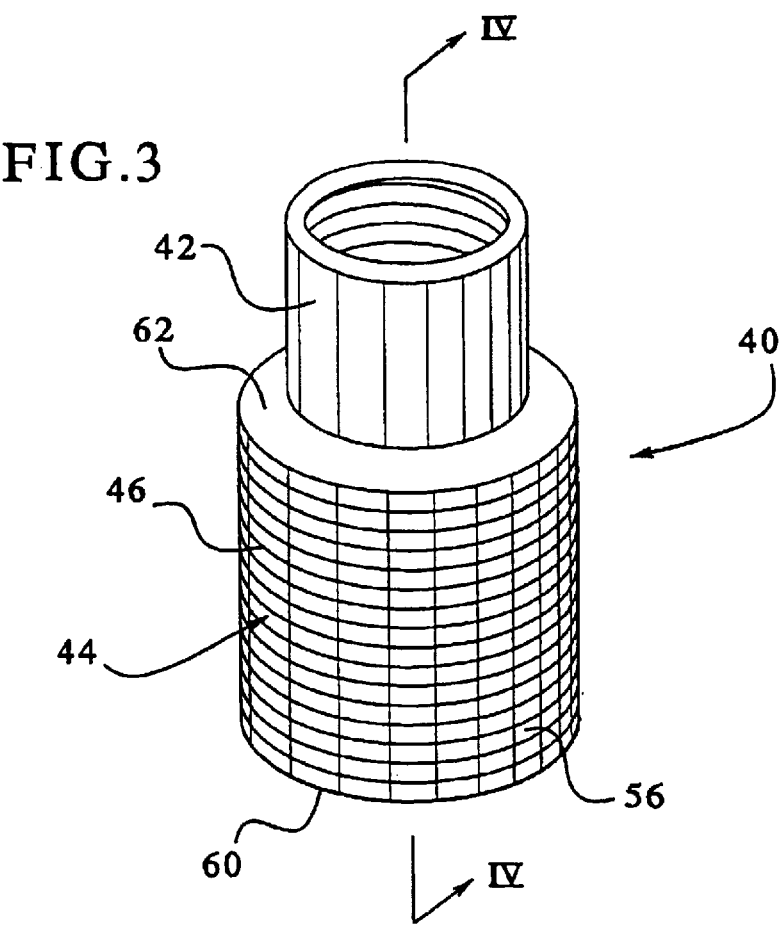
FIG. 3 is a perspective view of a nozzle constructed in accordance with teachings of the present invention.
Figure 4:
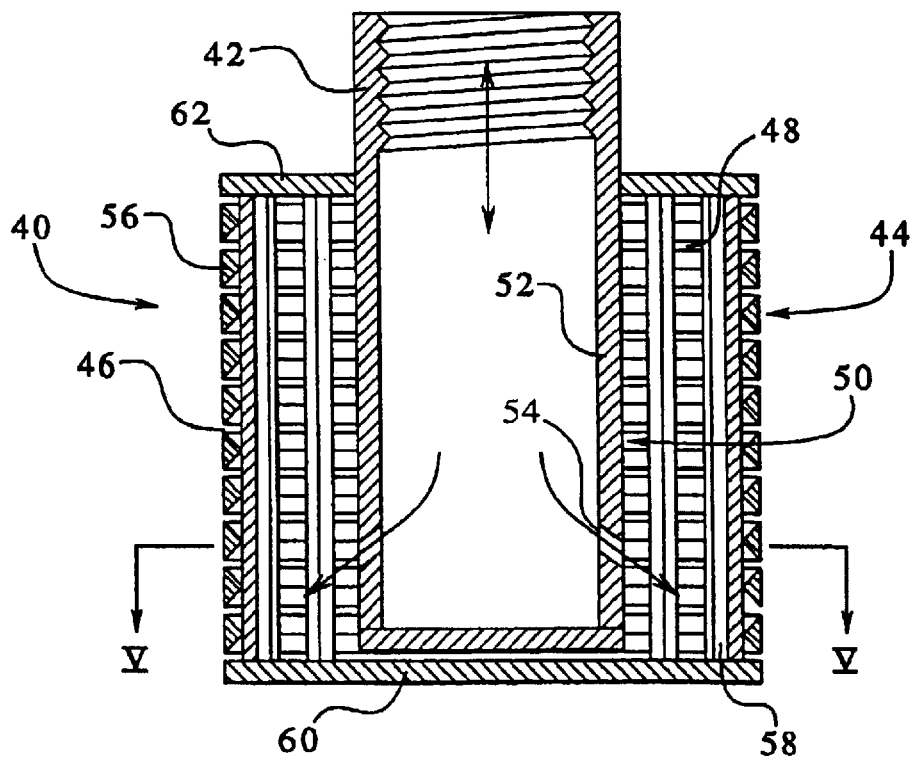
FIG. 4 is a sectional, view as taken generally along line IV—IV of FIG. 3.

To withdraw fluid from the medium, the treatment system 20 includes a lower manifold 34, as shown in FIG. 1. Referring to FIG. 2, the lower manifold 34 includes a plurality of pipe branches 36 in common communication with a lower main line 37. Referring back to FIG. 1, the lower manifold 34 includes a plurality of vertical pipe extensions 38 which project downwardly from the pipe branches 36, and a plurality or filter screen nozzles 40 are mounted to the respective pipe extensions 38. The nozzles 40 are immersed in the medium 26, preferably near a bottom of the vessel 22. As illustrated in FIGS. 3 and 4, each of the nozzles 40 generally includes a duct 42 for communicating with the lower manifold 34 and an outer screen 44 constructed of wire or mesh, defining screen openings 46. The nozzle 40 includes an internal cavity 48 defined by the screen 44.

Figure 12:
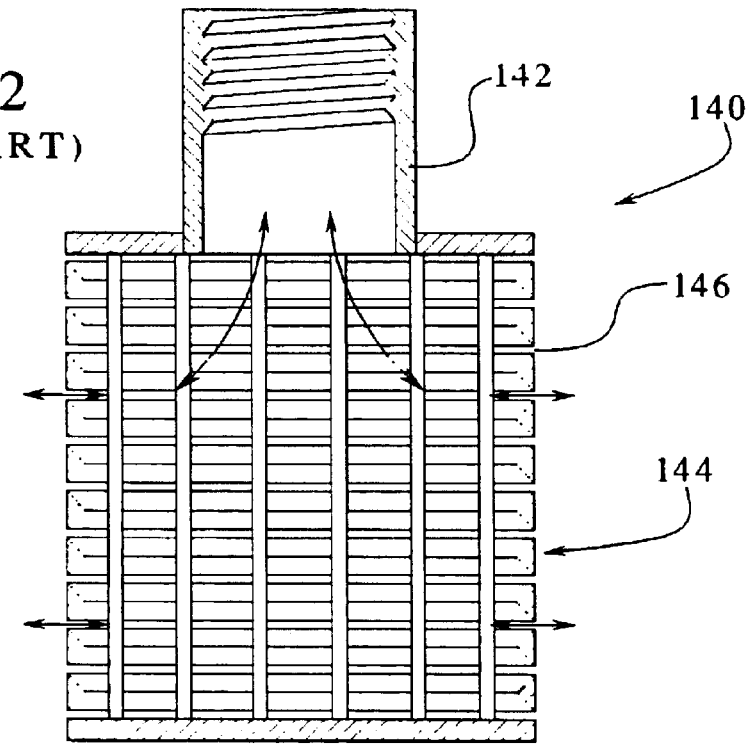
FIG. 12 is a sectional side view of a conventional nozzle.

Briefly referring to the prior art, a conventional nozzle 140, as illustrated in FIG. 12, included a duct 142 and an outer screen 144 constructed wire or mesh. The outer screen 144 defined a plurality of screen openings 146 sized very narrowly to prevent passage of a processing medium. Accordingly, as described above in the background section, the flow rate of the conventional nozzle 140 was controlled by the total area of the collective screen openings 146, as the screen openings 146 were smaller than the area of the duct 142. Various factors contribute to significant changes to the screen opening area over time, including, wearing of the triangular screen wires and plugging of the narrow openings 146. Accordingly, the conventional nozzle 140 would yield a flow rate that is known to undesirably vary during service.

Figure 10:
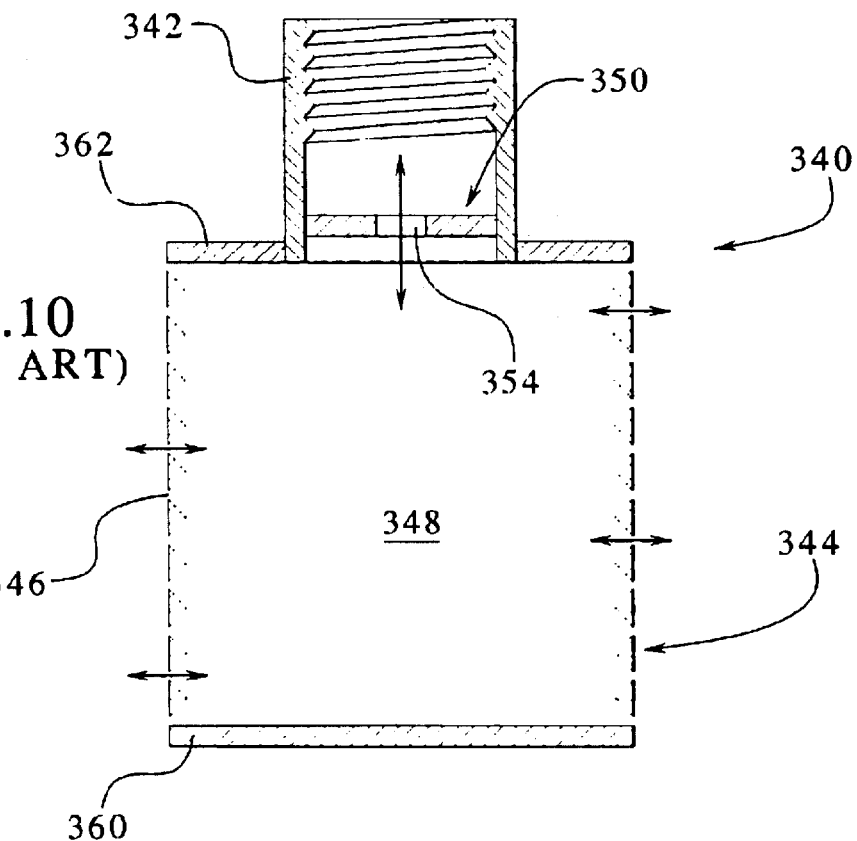
FIG. 10 is a sectional side view of a conventional nozzle having a disc-shaped restrictor plate.

According to another conventional embodiment, FIG. 10 illustrates a known nozzle 340 having a disc-shaped restrictor plate 350. The nozzle includes a screen 344, a duct 342, an upper plate 362 and a bottom plate 360 defining an interior cavity 348. The restrictor plate 350 is mounted in the duct 342 and includes an orifice 354. The orifice 354 is operable to restrict flow through the duct, but is not capable of directing or concentrating flow through any particular portion of the screen 344.

Figure 13:
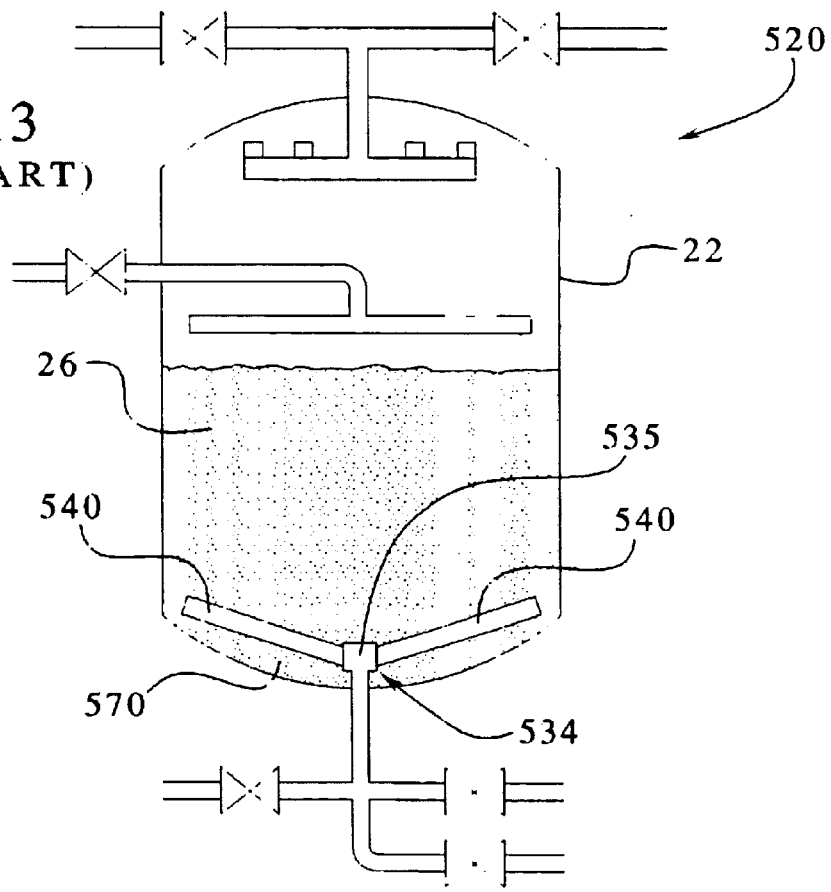
FIG. 13 is a sectional, schematic, side view or a fluid treatment system having conventional pipe-based filter screen nozzles.

Another type of conventional nozzle is shown in FIG. 13, which illustrates a fluid treatment system 520 having known pipe-based filter screen nozzles 540. Each of the pipe-based filter screen nozzles 540 is similar to the conventional filter screen nozzle 140 described in connection with FIG. 12, except the nozzle 540 is elongated. A lower manifold 534 includes a central hub 535 to which a plurality of the nozzles 540 are mounted. Each of the nozzles 540 extends radially outwardly toward a vertical side of the vessel 22. Unfortunately, due to the typically rounded, concave shape of the bottom of the vessel 22, the long straight nozzles 540 must be positioned vertically above a significant volume 570 of the medium 26. Therefore, the medium 26 in the bottom volume 570 is not effectively utilized, and the efficiency of the system 520 is not optimally realized.

According to an aspect of the invention, each of the nozzles further includes an internal flow restrictor which limits the flow rate of the nozzle and which provides directional and positional control of flow within the interior of the screen. The restrictor includes at least one orifice to provide communication between the duct and the inner cavity, and this orifice is positioned generally within the interior cavity defined by the screen. So that the predetermined flow rate of the nozzle is controlled by the restrictor, and not the screen, the total orifice area is less than the total screen opening area. Because the flow rate of the nozzle is not a function of the screen opening area, variations in flow rate are greatly reduced. Furthermore, the orifice may be positioned to concentrate flow through desired portions of the screen to optimize performance of the associated treatment system.

Figure 5:
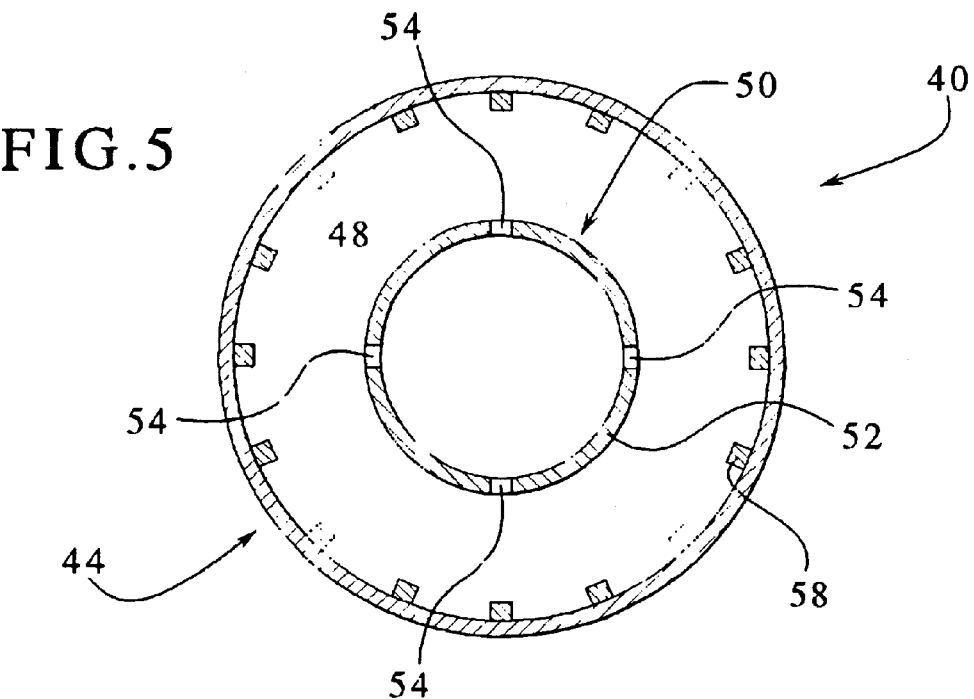
FIG. 5 is a sectional view as taken generally along line V—V of FIG. 3.

Specifically, referring to FIGS. 4 and 5, the nozzle 40 includes a restrictor 50. The restrictor 50, in the illustrated embodiment, includes a tube comprising a cylindrical wall 52 that extends downwardly from the duct 42, generally centrally, within the interior cavity 48 and concentrically to the screen 44. One ore more orifice 54 disposed in the restrictor 50. More particularly, in the illustrated embodiment, a plurality of orifices 54 are disposed in the restrictor wall 52. The restrictor 50 is positioned generally centrally within the interior cavity 48. The total area of the screen openings 46 is greater than the total open area of orifices 54. Thereby creating a significant pressure differential across the orifices 54, but not across the screen 44.

The nozzle 40 is capable of handling bi-directional flows. In particular, the nozzle 40 is operable to withdraw a flow from the exterior of the screen 44, into the interior cavity 48, through the orifices 54 and through the lower main line 37, or the nozzle 40 is operable to distribute fluid delivered from the duct 42, through the orifice 54 into the interior cavity 48 and outwardly from the screen 44.

To resist plugging by foreign particles, the screen 44 is preferably constructed from wire 56 having a triangular cross section, as shown in FIG. 4. The wire 56 is wound around a plurality of spaced vertical posts 58. Inclosing the interior cavity 48, the nozzle 40 further includes a bottom plate 60 mounted to a lower end of the screen 44, and an upper plate 62 mounted to an upper end of the screen 44 and extending around the duct 42. It should be noted that in other embodiments, the screen 44 could be constructed of other types of wire, mesh, or plastic molded to have correctly sized screen openings, and the screen may be constructed in other shapes, e.g., cubical, spherical, etc. Additionally, either the upper plate 62 and/or lower plate 60 may also contain screen openings (not shown).

The screen 44 is operable to filter the fluid from the medium 26. Specifically, the width of each individual screen opening 46 is smaller than the smallest diameter of a particle of the medium 26, yet big enough to allow fines to pass through the system. For example, in an embodiment wherein the medium 26 is deionizer resin beads, the screen openings 46 are narrowly shaped with a width of only a few thousandths of an inch. Such beads are typically about 2 mm in diameter.

For directional control of flow, the orifices 54 are placed at respective positions and orientations for distributing flow for optimal effectiveness. In the embodiment illustrated in FIG. 4, for example, each of the orifices 54 is positioned near a bottom of the nozzle 40, having an orientation at an angle Φ toward a bottom of the screen, non-perpendicular to an axis of the cylindrical wall 52. Additionally, as illustrated in FIG. 5, the orifices 54 are positioned at a variety of radial positions.

It has been found that circular orifices 54 are easily made by drilling, although it should be understood that an orifice 54 may be provided in any desired shape, such as a rectangular slot, etc. In an embodiment wherein the restrictor 50 is made of plastic, an orifice 54 my be easily molded in any shape. Furthermore, the restrictor 50 may be orifices may be at any position on the restrictor wall 52 as needed to provide a particular flow profile. Also, the restrictor 50 may be provided in various shapes and configurations effective to limit the flow rate internally of the screen 44.

Figure 6:
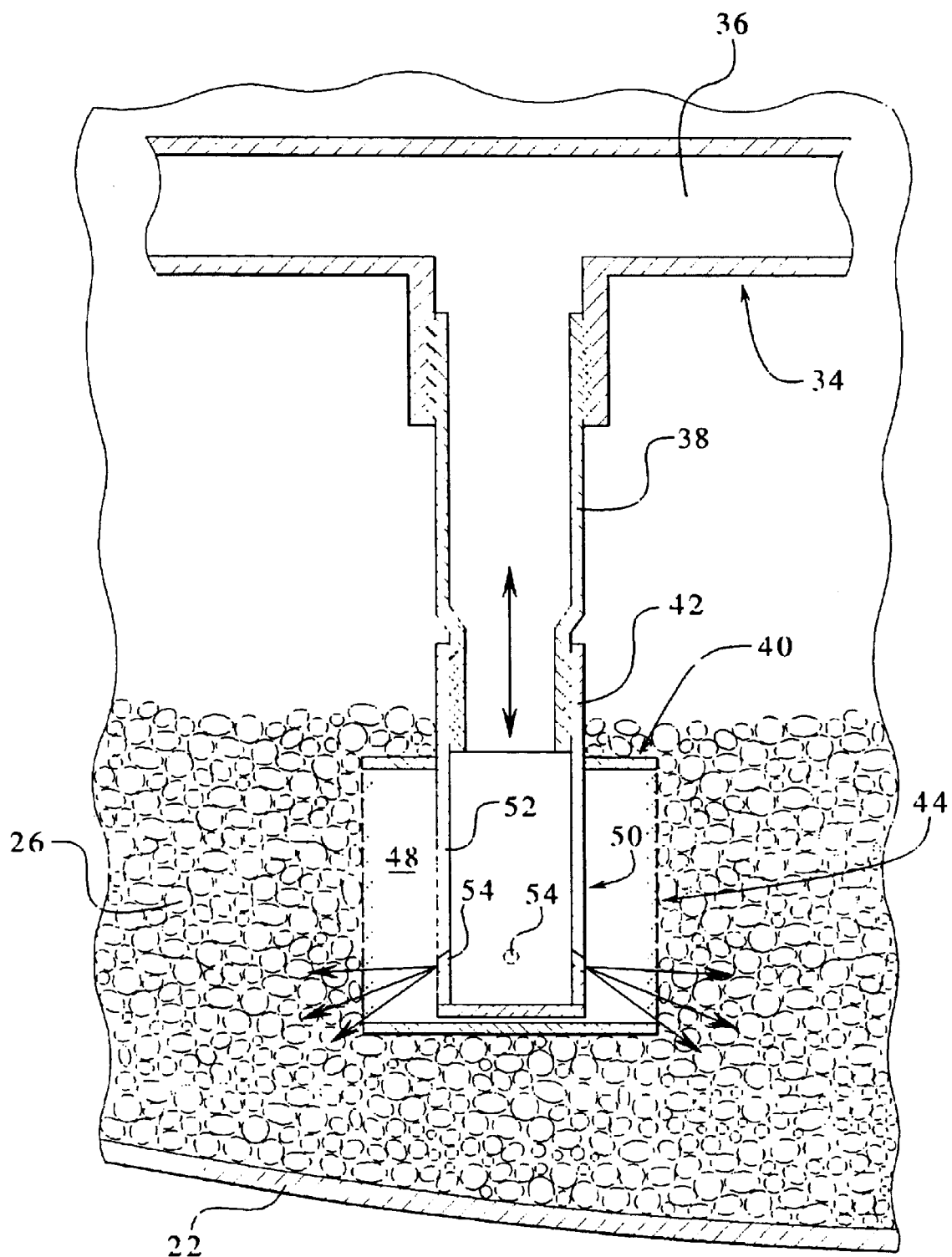
FIG. 6 is a fragmentary, sectional, schematic view through the reactor vessel, illustrating a nozzle of a lower manifold immersed in processing medium beads.

For example, in the nozzle 40 of FIG. 6, in order to optimize the fluid contact with the medium 26, the orifices 54 are positioned near a bottom of the restrictor 50 to enhance flow at a bottom of the nozzle 40. This promotes fluid flow through portions of the medium near a bottom wall of the vessel 22, as indicated in FIG. 6, thereby maximizing the flow path of the fluid through the medium 26.

To further optimize fluid contact with a maximum volume of the medium 26, as illustrated in FIG. 1, the vertical pipe extensions 38 have various lengths as necessary to position the respective nozzles 40 near the bottom of the vessel 22. This enables the nozzles 40 to induce flow through the entire volume of the medium 40. In an embodiment wherein the nozzles 40, vertical pipe extensions 38 and lower manifold 34 are mounted together with threaded fittings, the nozzles 40 are spaced slightly above the bottom of the vessel 22 to permit room for assembly. By positioning each of the nozzles 40 near the bottom of the vessel 22, the system 20 greatly reduces unused volume of the medium 26, as has been problematic in some conventional systems as described in connection with FIG. 13. It should be understood, however, that nozzles 40 according to the invention may be provided at various orientations, such as horizontal or angled orientations, as needed in different treatment systems.

Metal or plastic may be used for making the nozzle 40, screen and manifold. Of course, the materials must be selected for compatibility with the particular process and regeneration fluids to be used. Preferred materials include stainless steel alloys, including Alloy 20 and 316 stainless steel. Metallic strainer construction provides strength, which may be important in day-to-day situations. For example, in an embodiment wherein a person might step on the lower manifold during a maintenance operation, a sturdy metallic construction is desired. Where strength is not a concern, the lower manifold 34 and nozzles 40 may be constructed of suitable thermoplastic materials.

So that the nozzle 40 provides a consistent predetermined flow rate over long time periods, the restrictor 50 is constructed so that the orifice is subject to susceptible to less wear and plugging than the screen openings 46. Because the orifices 54 are located internally of the screen 44, the orifices 54 do not need to perform a physical filtering function, and thus, each of the orifices 54 may have a wider shape than the narrow screen openings 46. Further enhancing the wearability, the orifice 54 has a bore with a uniform diameter, in contrast to the diverging shape of the screen openings 46 due to the triangular wire 56. Additionally, the restrictor 50 is preferably made relatively thick material. Due to these features, the orifice 54 will resist wearing to an increased area, thereby providing a consistent flow rate and pressure drop across the orifice for a long time.

Figure 7C:
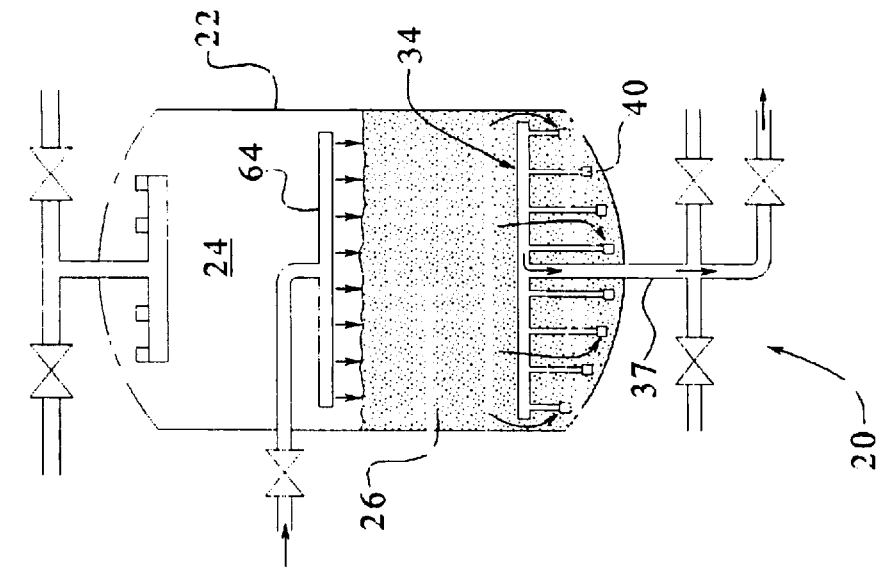
FIGS. 7a–7c are schematic views of the fluid treatment system in various modes of operation.
Figure 7B:
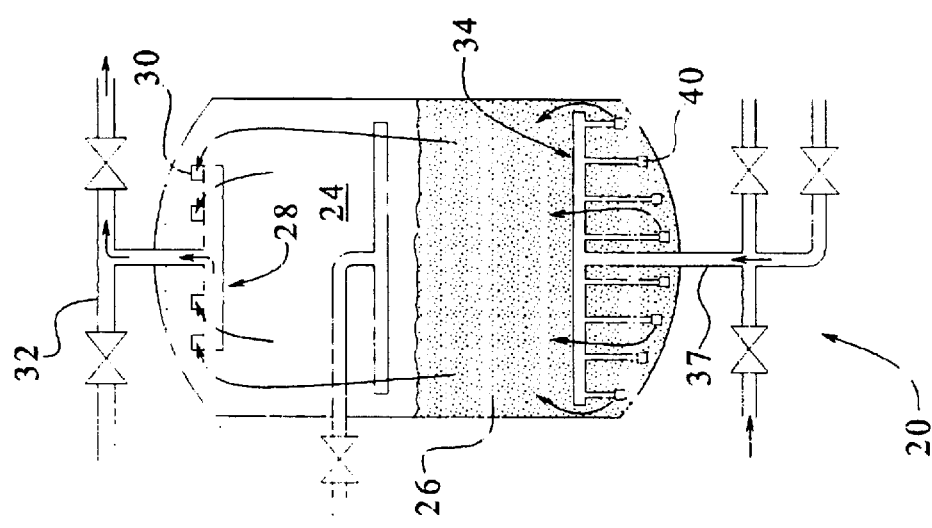
Figure 7A:
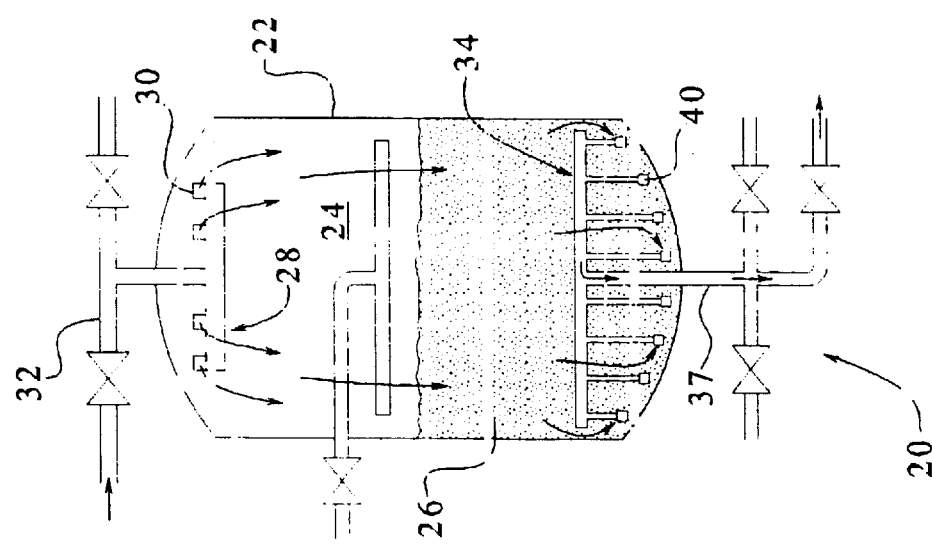

To process fluids, the treatment system 20 normally operates in a service mode as illustrated in FIG. 7a. In this mode, the process fluid is delivered from the upper main line 32 to the upper manifold 28, the fluid exiting from the upper nozzles 30 mounted on the upper manifold 28 and entering the interior chamber 24. The upper nozzles 30 are configured to uniformly distribute or sprinkle the process fluid over a top of the medium 26. The process fluid flows uniformly downward through the medium 26, thereby treating and/or purifying the fluid. The nozzles 40 then withdraw the fluid into the lower manifold 34 the fluid flowing through the lower main line 37.

For some applications, the treatment system 20 operates in a reverse mode, as illustrated in FIG. 7b. In the reverse mode, the process fluid is introduced through the lower manifold 37, saturating the medium 26 and filling the tank 22, being withdraw by the upper manifold 28. In these cases, the upper manifold 28 may be equipped with nozzles 40 to maintain proper flow distribution.

The reverse mode of FIG. 7b may also be periodically implemented in a system otherwise operating with a service mode as described in connection with FIG. 7a. The periodic flow reversal through the nozzles 40 helps to clear out particles that may have become jammed in the screen openings 46 (FIG. 4).

In order to regenerate or recondition the medium 26, the treatment system 20 is periodically operated in a regeneration mode, as illustrated in FIG. 7c. The regeneration mode is necessary because the medium 26 becomes exhausted over time and must be exposed to chemicals which renew the effectiveness of the medium. The particular chemicals depend upon the type of medium, as is generally know. The system 20 includes an internal distributor 64 mounted in an upper or middle portion of the vessel 22. The distributor 64 introduces a flow of the chemicals above the processing medium 26. The chemicals flow down through the medium, thereby reconditioning the medium. The spent chemicals are extracted through the nozzles 30 of the lower manifold 34 near the bottom of the tank vessel 22.

Keeping the cost of improvement low, the nozzle 40 may be retrofit to existing treatment vessels, replacing the existing conventional filter nozzles. At the same time, any false bottoms are preferably removed, and vertical pipe extensions are also replaced as necessary to position the nozzles to the bottom of the vessel, whether the bottom curved, conical, etc. It has been found that the nozzle 40, when retrofit to an otherwise conventional filtration or ion exchange system, results in an increase in treatment efficiency of about 10–35%.

The nozzle 40 can work efficiently over a range of pressure and flow conditions. It has been found that suitable performance is achieved when a flow velocity across the flow orifice is maintained between about 2 to 10 feet per second, and when the pressure drop across the interior cavity is between about 0.25 to 3 psi.

According to another application of the nozzle 40, one or more of the nozzles 40 may be used to de-water a medium. For example, referring to FIG. 6, if the medium 26 is a slurry, such as mud, the nozzle 40 may be used to withdraw moisture from the medium by applying a vacuum to the lower manifold 34. The openings 46 in the screen 44 permit the passage of liquid, but at the same time preventing the passage of larger particles. Due to the orifices 54, the flow rates among a plurality of the nozzles 40 will remain the same in such a de-watering process. In order to clean out the nozzles 40 and prevent clogging, liquid is occasionally forced outwardly from the duct 42 through the orifices 54 and the screen openings 46 as needed to maintain flow.

Figure 8:
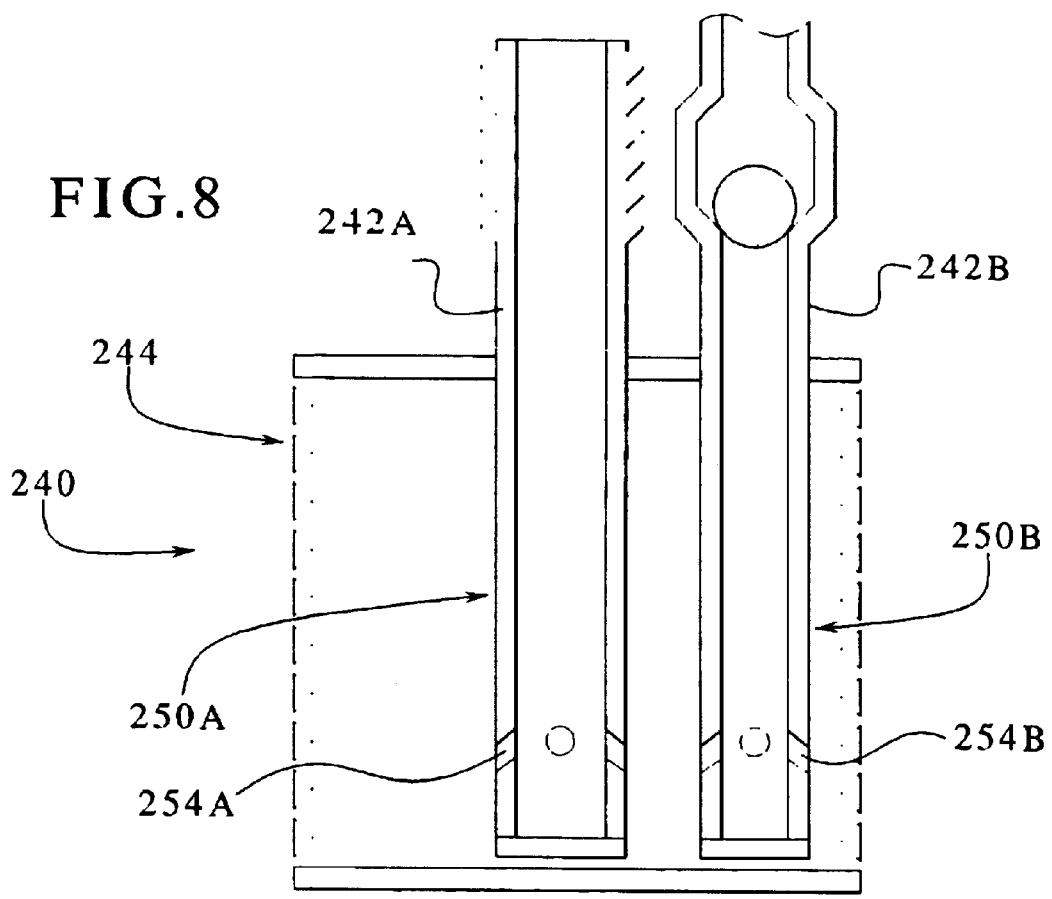
FIG. 8 is a sectional, schematic, side view of a nozzle according to an alternative embodiment having a dedicated regeneration fluid tube.

To help isolate the regeneration chemicals and their effects, a nozzle 240 is illustrated in FIG. 8 according to another embodiment. The nozzle 240 generally includes a duct 242A, an outer screen 244 having screen openings 246, an interior cavity 248 defined by the screen 244, bottom and upper end plates 260, 262 enclosing the interior cavity 248. The nozzle 240 has a dedicated restrictor 250A with at least one orifice 254A for handling flows of the process fluid. However for handling flow of the chemical fluid during regeneration, the nozzle 240 further includes a dedicated auxiliary restrictor 250B. The auxiliary restrictor 250B includes at least one auxiliary orifice 254B having a total orifice area less than the total area of the screen openings 246. Accordingly, the flow rate of regeneration chemicals is controlled by the auxiliary restrictor 250B, not the screen 244, creating a pressure differential the auxiliary orifice 254B during the chemical flow of the regeneration cycle.

Figure 9:
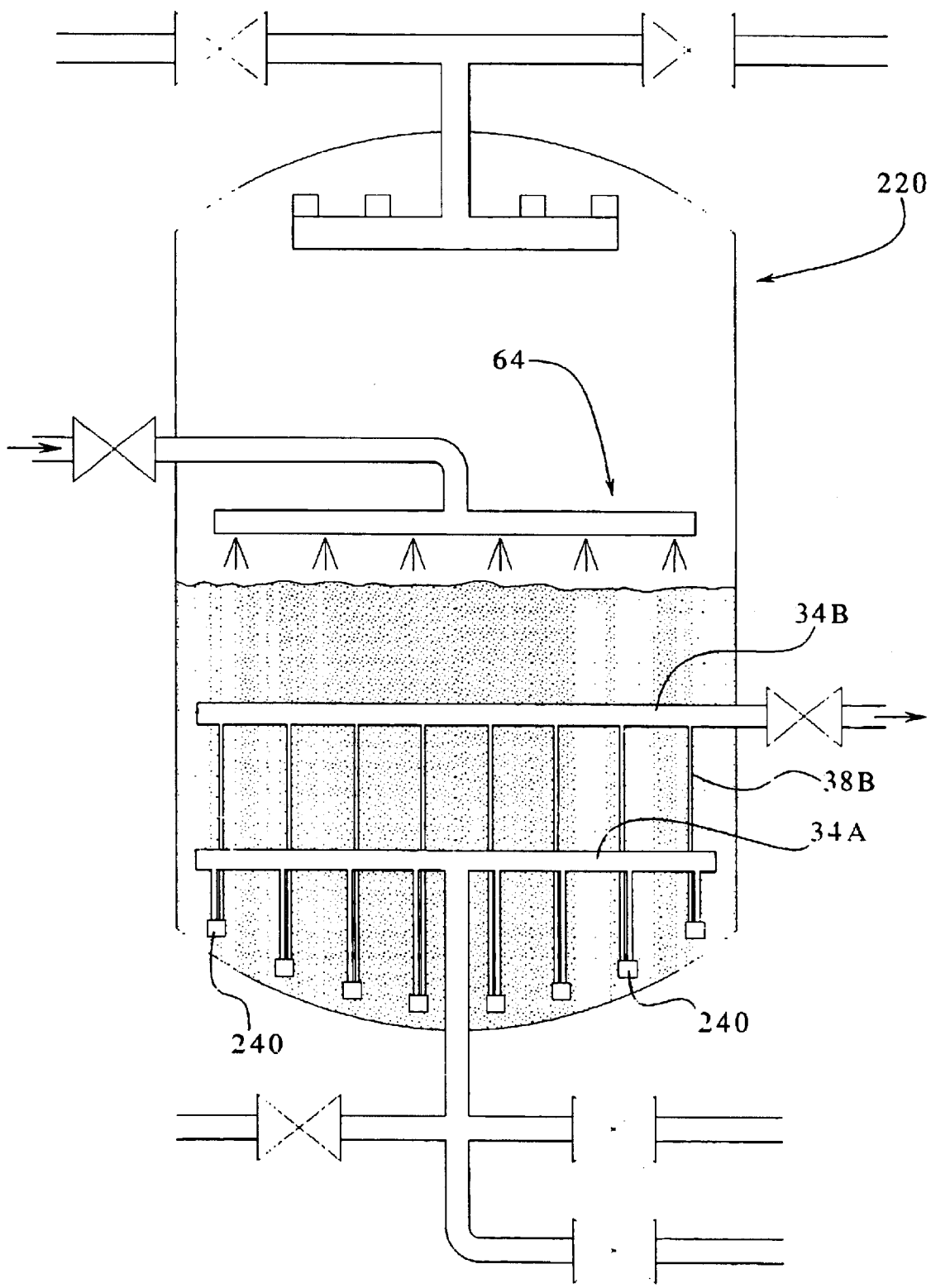
FIG. 9 is a sectional side view of a fluid treatment vessel incorporating the nozzle of FIG. 8.

A system 220 equipped with the nozzle 240 is illustrated in FIG. 9, shown in a regeneration mode. The system 220 includes an auxiliary manifold 34B to handle chemical flows, in addition to the lower manifold 34A to withdraw the process flow. The auxiliary manifold 34B includes a plurality of auxiliary pipe extensions 38B that are mounted in communication with the auxiliary restrictor 34B (FIG. 8). Because only the auxiliary restrictor 250B and auxiliary manifold 34B are subjected to the chemical flows, effects of the chemicals are isolated to these components. This reduces wearing effects of the chemicals on the process restrictor 250A, thereby helping to keep the flow rate from changing. Also, auxiliary manifold keeps the chemicals separate from the lower manifold 34A, thereby helping keep traces of the regeneration chemicals entering from the process fluid. This type of feature can be greatly beneficial to certain unit operations, such as production of ultrapure water, wherein any trace of undesired chemicals can be highly detrimental to the treated water quality.

In order to prevent flow reversal, one or more check vales may be provided. For example, the nozzle 240 of FIG. 8 may include an integral check valve 80 positioned in the auxiliary duct 342B. This is particularly useful to keep regeneration chemical from returning. Such a feature saves time and costs by eliminating a need to flush the entire auxiliary duct 342B before switching back to the service mode and also reducing the amount of chemical needed for regeneration. A check valve 80 may also be provided in the duct 342A if flow is desired in only one direction. The check valves 80 can function as a safety feature, preventing the backflow of regeneration chemicals during a normal fluid processing mode. It should be understood that a check valve could be provided in any fluid passage of the systems described herein.

In a further embodiment, one or more of the nozzles have multiple auxiliary restrictor (not shown). Additionally, multiple auxiliary manifolds may be provided in communication with these multiple restrictor. Such a system keeps various fluids isolated in dedicated plumbing for each fluid. This prevents undesired contamination or mixing of fluids and also reduces wear on the various orifices.

Figure 11:
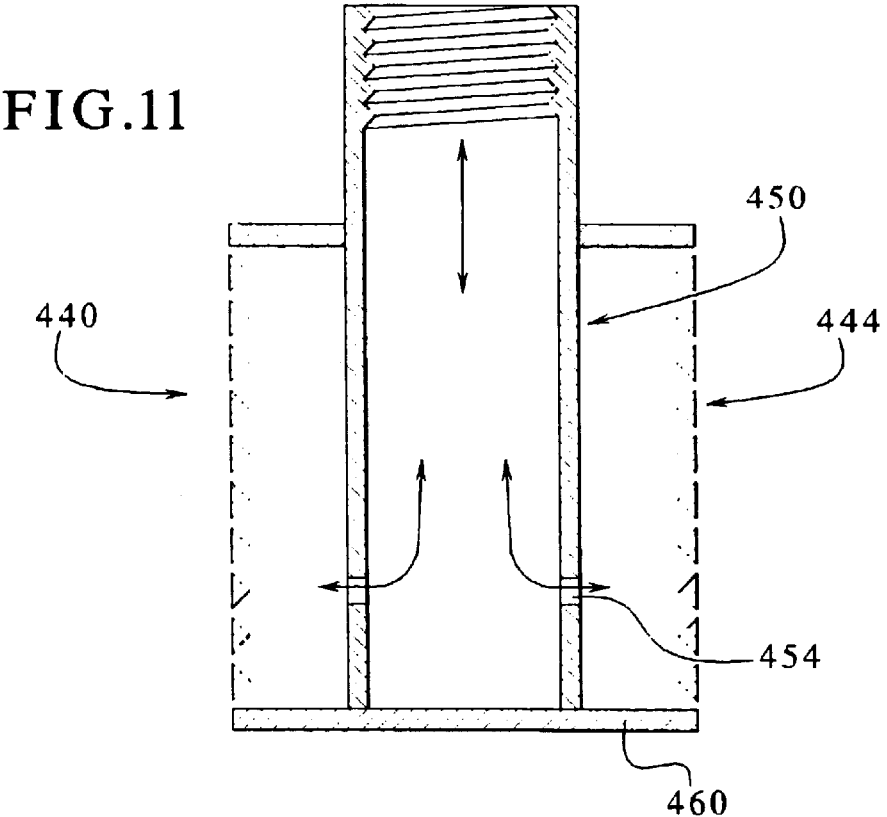
FIG. 11 is a sectional side view of a nozzle according to an alternative embodiment wherein the restrictor wall extends to a bottom plate of the nozzle.

FIG. 11 illustrates another embodiment of the nozzle 440. The nozzle 440 is similar to the nozzle 40 of FIGS. 3 and 4, but the nozzle 440 includes a restrictor 450 having a cylindrical wall 452 that extends downwardly against the bottom plate 460. The nozzle 440 uses few parts, yet provides directionally controlled orifice flow. Additionally, in the illustrated embodiment, the nozzle 440 includes orifices 353 which are oriented generally perpendicularly to a central axis of the nozzle 440.

Although the present invention has been described with reference to preferred embodiments, it will be understood that the invention is not limited to the specific features of the described embodiments. Various substitutions and modifications to the present invention will be apparent to those skilled in the art. Such substitutions and modifications may be made without departing from the spirit and scope of the invention. Therefore, all such substitutions and modification are intended to be covered by the appended claims.

What is claimed is:

1. A process for demineralizing a process fluid comprising the steps of:

provising a vessel having an inner chamber containing an ion exchange demineralizing processing medium to which fluid can pass;

introducing a process fluid into the chamber;

providing a manifold including a plurality of nozzles in said demineralizing medium in communication with an outlet, each of the nozzles including an outer screen defining an interior cavity, the screen having a plurality of screen opening having a collective screen opening are, a duct, and an elongated hollow flow restrictor having a longitudinal axis and being disposed in said interior cavity, said hollow flow restrictor having at least one orifice providing fluid communication between the duct and the interior cavity, said at least one orifice being disposed at an angle other than perpendicular to said longitudinal axis and having a collective orifice area less than the screen opening area; and drawing process fluid through the at least one orifice of said restrictor during processing for creating a pressure differential across said at least one restrictor orifice such that a distinct directional flow of said fluid is caused through said at least one orifice and in said interior cavity.

2. The process according to claim 1 further comprising:

ceasing the introducing of process fluid;

introducing a reconditioning fluid into the medium; and withdrawing the reconditioning fluid into the nozzle through the screen openings so that the fluid flows across the interior cavity, through the at least one orifice and into the duct.

3. The process according to claim 1, further comprising:

providing the nozzle with an auxiliary duct and an auxiliary restrictor having at least one auxiliary orifice with a total orifice area less than the screen opening area, the orifice providing fluid communication between the auxiliary duct and the interior cavity;

ceasing the introducing of process fluid;

introducing a reconditioning fluid into the medium; and withdrawing the reconditioning fluid into the nozzle through the screen openings so that the fluid flows across the interior cavity, though the at least one auxiliary orifice and into the auxiliary duct.

4. The process according to claim 1, further comprising the step of forcing liquid outwardly through the screen openings to clean the openings.

5. A demineralization fluid treatment system comprising:

a vessel, a granular ion exchange demineralizing processing medium located in at least a lower portion of the vessel;

a first manifold for introducing fluid into the vessel; and a second manifold for withdrawing fluid from the medium, said second manifold including a fluid exit duct, and a plurality of nozzles suspended in the demineralizing medium, said nozzles each being in communication with the fluid exit duct, said nozzles each having an external screen defining an interior cavity, said screen having a plurality of screen openings immersed in said demineralizing processing medium defining a collective exterior open area communicating with said interior cavity, a flow restrictor in the form of a hollow conduit within said interior cavity, said flow restrictor having at least one orifice formed in a wall thereof at an angle nonperpendicular to a longitudinal axis of the conduit for permuting communication of fluid between said interior cavity and said duct, and said at least one orifice collectively having a total orifice area less than the collective open area of said screen such that during operation of the treatment system the fluid flow rate through the nozzle is controlled by said restrictor and a pressure differential created across the at least one orifice is sufficient for generating a directional fluid flow in said internal cavity and through the at least one orifice.

6. The demineralization fluid treatment system of claim 5, wherein the orientation of the at least one orifice is such that a flow of fluid from the orifice into the cavity is directed toward a bottom portion of screen.

7. The demineralization fluid treatment system of claim 5, wherein the screen is generally cylindrical, the nozzle further comprising an end cap mounted to a bottom of the screen.

8. The demineralization fluid treatment system of claim 5, wherein the screen is generally cylindrical, the nozzle further comprising an end cap mounted to a bottom of the screen, wherein the restrictor further comprises an end wall mounted to an end thereof, the end wall being spaced from the end cap.

9. The demineralization fluid treatment system of claim 5 in which said nozzles are suspended in closely spaced relation to a bottom of said vessel.

10. The demineralization fluid treatment system of claim 5 in which said flow restrictor is in the form of a tube.

11. The demineralization fluid treatment system of claim 5 in which said flow restrictor has a cylindrical wall.

12. The demineralization fluid treatment system of claim 11 in which said flow restrictor is concentrically mounted within said screen.

13. The demineralization fluid treatment system of claim 11 in which said flow restrictor includes a plurality of said orifices cirmunferentially about the wall thereof.

14. A demineralization fluid treatment system comprising:

vessel, a granular ion exchange demineralizing processing medium located in at least a lower portion of the vessel;

a first manifold for introducing fluid into the vessel;

a second manifold for withdrawing fluid from the medium, said second manifold including a fluid exit duct, and a plurality of nozzles suspended in the demineralizing medium, said nozzles each being in communication with the fluid exit duct, said nozzles each having an external screen defining an interior cavity, said screen having a plurality of screen openings immersed in said demineralizing processing medium defining a collective exterior open area communicating with said interior cavity, a flow restrictor in the form of a hollow conduit within said interior cavity, said flow restrictor having at least one orifice formed in a wall thereof permitting communication of fluid between said interior cavity, and said duct, and said at least one orifice collectively having a total orifice area less than the collective open area of said screen such that during operation of the treatment system the fluid flow rate through the nozzle is controlled by said restrictor and a pressure differential created across the at least one orifice is sufficient for generating a directional fluid flow in said interior cavity and through the at least one orifice, each of said nozzles further including an auxiliary duct, an auxiliary restrictor having at least one auxiliary orifice providing communication between the auxiliary duct and the interior cavity, and said vessel further including an auxiliary manifold in communication with said auxiliary duct.

15. The demineralization fluid treatment system of claim 14, wherein the auxiliary restrictor includes a tube positioned within the interior cavity, and said at least one orifice being disposed in a wall of said tube.

16. The demineralization fluid treatment system of claim 15, wherein the auxiliary restrictor further includes a check valve mounted upstream of the tube to permit one-way flow away from the auxiliary orifice.

* * * * *